Sept. 20, 1966 M. A. SANDERS 3,274,587
COMBINED ELECTRICAL CONNECTOR AND INDICATOR
Filed May 13, 1964 2 Sheets-Sheet 1
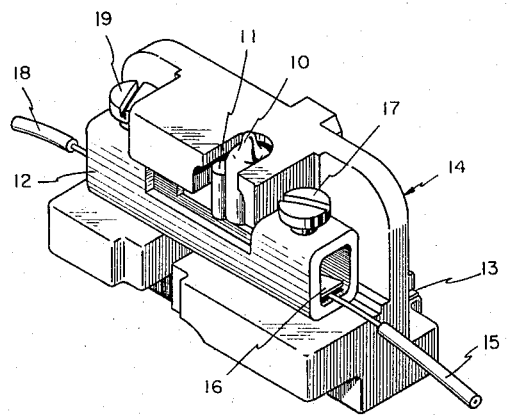
Fig. 1.
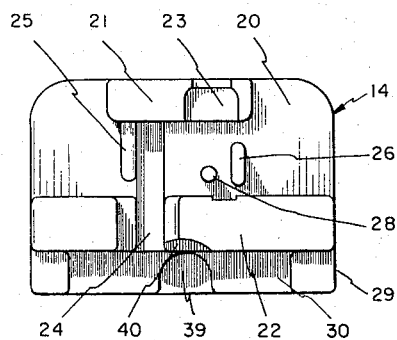
Fig. 2.
Fig. 3.
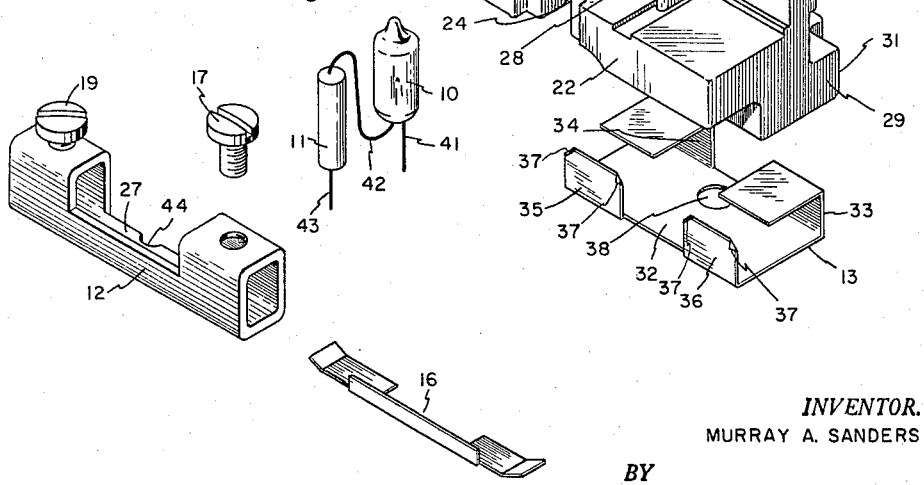
INVENTOR.
MURRAY A. SANDERS
BY
R. J. Frank
ATTORNEY.

Sept. 20, 1966  M. A. SANDERS  3,274,587
COMBINED ELECTRICAL CONNECTOR AND INDICATOR
Filed May 13, 1964  2 Sheets-Sheet 2

INVENTOR.
MURRAY A. SANDERS
BY
R. J. Frank
ATTORNEY.

United States Patent Office 3,274,587
Patented Sept. 20, 1966

3,274,587
COMBINED ELECTRICAL CONNECTOR AND INDICATOR
Murray A. Sanders, 40 Dianas Trail, Roslyn, N.Y.
Filed May 13, 1964, Ser. No. 366,950
6 Claims. (Cl. 340—381)

This invention relates to electrical connectors and in particular to a terminal block embodying a voltage actuated device.

Terminal blocks are widely used in electrical equipment for coupling external cabling to internal wiring and for making interconnections within the equipment. Each block generally comprises a nonconducting support member and a primary conductor having terminals at each end secured to the support member. One or more wires from the external cabling are fastened to one of the terminals on the block and one or more wires associated with components located within the equipment are fastened to the other terminal. In complex apparatus, such as switchboards for the control of electric power plants or industrial processes, large numbers of these blocks are often combined to form vertically or horizontally mounted terminal strips.

Finding defective components or wiring in such apparatus requires skilled personnel and is often tedious and time consuming. However, many defects can be located by merely noting whether or not voltage is present on a particular terminal under a given set of operating conditions. Thus, much trouble-shooting can be accomplished by connecting one probe of a voltmeter or other voltage indicating device to a ground bus and connecting the other probe sequentially to each of the block terminals. The presence or absence of voltage on each of the terminals gives an indication of the condition of the associated components.

This testing procedure has several disadvantages. It requires the use of external test equipment and may expose personnel to dangerous voltages while connecting and reading the test instruments. Also, due to the time required to change connections, it does not permit the repairman to simultaneously observe all terminal voltages. This can be especially important when there are a large number of terminals and operating conditions may change before the testing has been completed.

Further, a relatively unskilled or busy operator, while able to follow specific instructions for the replacement or repair of a specific component once the trouble is known, may be unable to make the voltage measurement necessary to locate the defective component. As a result, expensive equipment may have to be shut down unnecessarily until a repairman can be summoned.

Accordingly, it is an object of my invention to provide an improved integral terminal block incorporating means for indicating the presence or absence of voltage between the terminals of the block and a common ground conductor.

It is another object of the invention to provide a terminal block which includes means for visually determining whether voltage has been applied between the terminals and the ground conductor.

Still another object is to provide a terminal block which includes a ground conductor.

Yet another object is to provide a terminal block which may be mechanically and electrically coupled to other blocks to form an integral terminal strip.

A further object is to provide a terminal strip comprising individual blocks wherein each terminal block includes a voltage indicating lamp.

In the present invention combined electrical connector and indicator modules are provided wherein each module comprises an electrically nonconductive support member, primary and ground conductors secured to the support member, and a voltage indicating device electrically coupled between the primary and ground conductors. More particularly, the support member comprises an electrically nonconductive plate section having upper and lower spaced nonconductive flanges extending from its surface. The primary conductor is provided with spaced apart input and output terminals at each end and is secured between nonconductive retention members affixed to the plate section. The ground conductor is affixed to a base section extending below the plate section of the support member. A light emitting device, such as an indicator lamp projects through an aperture in the upper flange and is electrically connected in series with a resistor positioned in an opening in the lower flange, the series-connected lamp and resistor being coupled between the primary and ground conductors.

Each terminal block may be mechanically joined to an identical block by means of a key which fits into a keyway located in the adjacent block. This key not only positions the terminal blocks with respect to each other but also holds the indicator lamp in place. When a number of blocks are joined together to form a terminal strip, the ground conductors butt against each other to form effectively a continuous ground electrode extending along the entire length of the strip.

In use, one or more terminal blocks are affixed to a panel or other supporting structure of the associated electrical apparatus. Leads from equipment external to this apparatus are connected to the input terminals of the blocks and leads connected to equipment within the apparatus are connected to the output terminal of the blocks. The ground conductor is usually maintained at the system ground potential.

When the equipment is energized, certain of the indicator lamps will be lit while others will be dark. Thus, it is possible to tell at a glance whether voltage is present on a given terminal and whether the lamp pattern is correct for a given mode of operation. When the observed lamp pattern indicates abnormal operation, it is often possible for a relatively unskilled operator to remedy the defect by consulting a prearranged chart which explains the procedure to be followed under the observed conditions.

The above objects of and the brief introduction to the present invention will be more fully understood and further objects and advantages will become apparent from a study of the following description in connection with the drawings, wherein:

FIG. 1 is a perspective view of my electrical connector,

FIG. 2 is a front view of the support member with all other components removed,

FIG. 3 is an exploded view showing the components comprising the connector,

Figure 7:
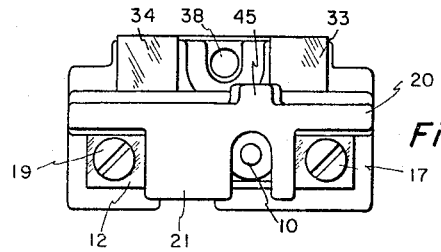
FIG. 7 is a top view of the connector of FIG. 4.

Referring to FIG. 1, there is shown a perspective view of an embodiment of my connector in which an indicator lamp 10 is electrically coupled in series with a resistor 11 between a primary conductor 12 and a ground conductor 13. The lamp 10 and conductors 12 and 13 are supported by an electrically nonconductive support member shown generally at 14. An input lead 15 is inserted under spring clip 16 at one end of primary conductor 12 and held in place by screw 17. Similarly, an output lead 18 is inserted at the other end of primary conductor 12 and held under spring clip 16 by screw 19. When a voltage of the proper magnitude is applied between either lead 15 or 18 and ground conductor 13, lamp 10 is energized indicating that voltage is present across primary conductor 12 and ground conductor 13.

FIG. 2 is a front view of the support member 14 with the lamp, resistor and conductors removed. As shown in this figure and in the exploded view of FIG. 3, support member 14 comprises a plate section 20 having spaced upper and lower flanges 21 and 22 respectively projecting from its surface. Upper flange 21 is provided with a U-shaped slot 23 and lower flange 22 is provided with a rectangular slot 24. First and second retention members 25 and 26 project from plate section 20 and are spaced from lower flange 22 by a distance slightly greater than the thickness of the central portion 27 of primary connector 12. A separator pin 28 is positioned adjacent retention member 26 and below the center of slot 23. A base section 29 located below the lower flange 22 has a front edge 30 indented from the front edge of lower flange 22 and a rear edge 31 extending beyond the rear of plate section 20. Support member 14 is made preferably of an insulating material such as Bakelite or other phenolic formaldehyde resin.

Figure 4:
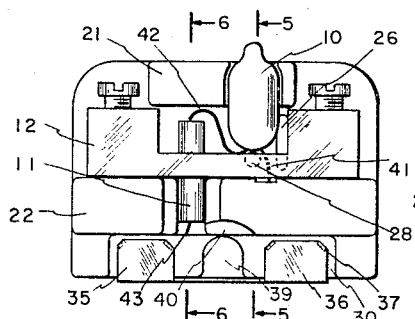
FIG. 4 shows the front of the assembled connector.
Figure 5:
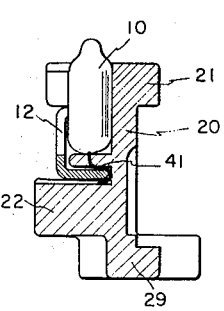
FIG. 5 is a sectional view taken along the lines 5—5 of FIG. 4.

The ground conductor 13 is fabricated from a material such as phosphor bronze and comprises a flat portion 32 having tabs 33, 34, 35, and 36 extending therefrom. As shown in FIGS. 4 and 7, ground conductor 13 is secured to base section 29 by pressing tabs 33 and 34 around the rear edge 31 and top of base section 29 and tabs 35 and 36 over the front edge 30. The corners of tabs 35 and 36 are bent out as shown at 37 to assure good contact with the ground conductor on the adjacent block when two or more blocks are joined together to form a terminal strip. A small hole 38 is located in flat portion 32 of the ground conductor for insertion of a mounting screw, depressions 39 and 40 in support member 14 providing space for the head of the screw.

Referring to FIGS. 1, 4, 5 and 7, it is seen that lamp 10 is located in the U-shaped slot in upper flange 21 with its top extending from flange 21. The lower portion of lamp 10 rests on retention member 26 which positions it securely in slot 23. The separator pin 28 keeps leads 41 and 42 properly spaced thereby preventing the lamp terminals from touching each other. Resistor 11 is located in the rectangular slot 24 in lower flange 22 and is connected to lamp 10 by lead 42. The characteristics of lamp 10 and resistor 11 depend upon the magnitude and frequency of the voltage to be applied to the connector. One lamp-resistor combination which may be employed when the voltage magnitude is between 105 and 125 volts is a type A1C lamp manufactured by General Electric Company and a 68,000 ohm. resistor.

Figure 6:
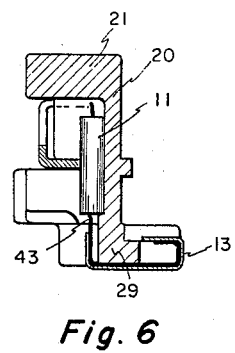
FIG. 6 is a sectional view taken along the lines 6—6 of FIG. 4.
Figure 8:
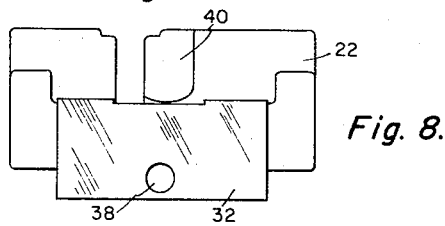
FIG. 8 is a bottom view.

As shown in FIGS. 4 and 6, the lead 43 from resistor 11 is bent away from lamp 10 to clear opening 38 and brought around base section 29 of support member 14 under ground conductor 13. Lead 43 is spot welded to conductor 13 to form a good electrical and mechanical ground connection. The function of resistor 11 is to reduce the voltage across lamp 10 and may, depending on the lamp used and the voltage applied between conductors 22 and 13, sometimes be omitted.

Primary conductor 12, which is made of copper, is supported by the lower flange 22, its central portion 27 being press fit between flange 22 and retention members 25 and 26. A notch 44 (FIG. 3) in central portion 27 fits around resistor 11 holding it in position in slot 24. Lead 41 (FIG. 5) from lamp 10 is held in place between primary conductor 12 and flange 22, lead 41 making good electrical and mechanical connection with conductor 12 because of the press fit of the conductor between flange 22 and retention members 25 and 26.

A key 45 having a width slightly less than the width of slot 23 is provided on the rear of the plate section 20 of support member 14. When two terminal blocks are fastened together, key 45 of the first block is fitted into slot 23 of the second block preventing the blocks from shifting laterally with respect to each other and, in addition, holding lamp 10 of the second block in position. Also, the rear edge 31 of base section 29 of the first block is fitted against the front edge 30 of the adjacent blocks, tabs 33 and 34 of ground conductor 13 of the first block making electrical contact with the tabs 35 and 36 of the second block.

Figure 9:
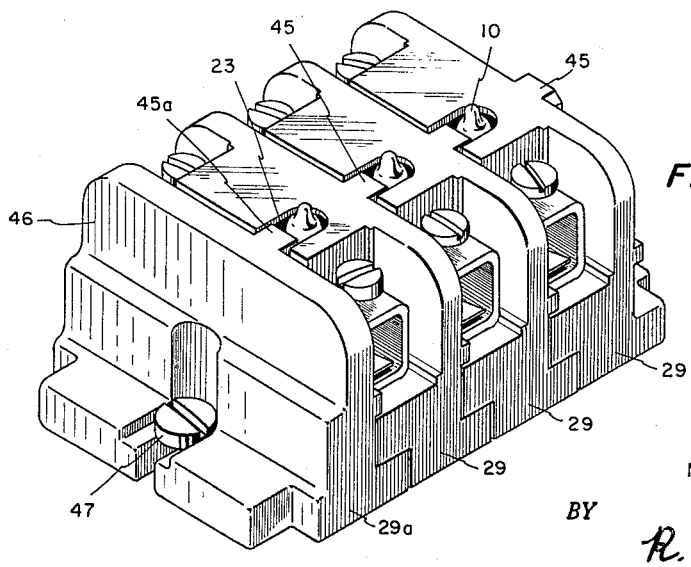
FIG. 9 is a perspective view showing several connectors coupled together to form a terminal strip.

A perspective view of three connectors formed in a terminal strip is shown in FIG. 9. The manner in which key 45 is inserted into the slot holding lamp 10 is shown in FIG. 9 as is the method of joining the base sections 29 together. An end section 46 is provided with a key 45a and a base section 29a. Key 45a fits into the slot 23 of the adjacent connector and base section 29a butts against the base section 29 of the adjacent connector. The strip is fastened to a panel or other supporting structure by means of a screw 47 in the end section 46 and additional screws inserted at regular intervals through the openings 38 in ground conductors 13.

As many changes could be made in the above construction and many different embodiments could be made without departing from the scope thereof, it is intended that all matter contained in the above description or shown in the accompanying drawings, shall be interpreted as illustrative and not in a limiting sense.

What I claim is:

1. Combined electrical connector and indicator modules in which each module comprises
   (a) an electrically nonconductive support member including a plate section having upper and lower spaced flanges extending from its surface, and a base section, said upper flange having an aperture therein,
   (b) an electrically conductive primary conductor having spaced apart input and output terminals secured to said lower flange, said primary conductor electrically connecting said input and output terminals,
   (c) an electrically conductive ground conductor secured to said base section, said ground conductor having a flat portion contiguous with the bottom of said base section and a plurality of tabs secured to the sides of said base section,
   (d) an indicating lamp positioned in said aperture in said upper flange, and
   (e) means electrically coupling said indicating lamp between said primary and ground conductors, said lamp being energized when a voltage is impressed between said primary conductor and said ground conductor.

2. Combined electrical connector and indicator modules in which each module comprises
   (a) an electrically nonconductive support plate,
   (b) upper and lower electrically nonconductive flange members extending from the surface of said support plate, said lower flange member being spaced from said upper flange member, said upper flange having an aperture therein,
   (c) an indicator lamp positioned within the aperture in said upper flange member,
   (d) an electrically conductive primary conductor having spaced apart input and output terminals secured to said lower flange, said primary conductor electrically connecting said input and output terminals,
   (e) an electrically nonconductive base section located below said support plate,
   (f) an electrically conductive ground conductor secured to said base section, said ground conductor having a flat portion contiguous with the bottom of said base section and a plurality of tabs secured to the sides of said base section, and
   (g) means electrically coupling said indicating lamp between said primary and ground conductors, said lamp being energized when a voltage is impressed between said primary conductor and said ground conductor.

3. A combined electrical connector and indicator comprising
   (a) an electrically nonconductive plate section,
   (b) upper and lower electrically nonconductive flange members extending from the surface of said plate section, said lower flange member being spaced from said upper flange member, said lower and upper flange members having apertures located therein,
   (c) first and second electrically nonconductive retention members secured to the surface of said plate section between said upper and lower flange members, the lower ends of said retention members being spaced from said lower flange member,
   (d) an indicator lamp having first and second terminals positioned in contact with said first retention member and extending through the aperture in said upper flange member,
   (e) a primary conductor having spaced apart input and output terminals positioned between said first and second retention members and said lower flange member, said primary conductor electrically connecting said input and output terminals,
   (f) an electrically nonconductive base member extending below said plate section,
   (g) a ground conductor secured to said base member,
   (h) a resistor positioned in the aperture in said lower flange member, and
   (i) means for electrically connecting one terminal of said indicator lamp to said primary connector and the other terminal to one end of said resistor, the other end of said resistor being connected to said ground conductor, said lamp being energized when a voltage is impressed between said primary conductor and said ground conductor.

4. A combined electrical connector and indicator comprising
   (a) an electrically nonconductive plate section having first and second surfaces,
   (b) upper and lower electrically nonconductive flange members extending from the first surface of said plate section, said lower flange member being spaced from said upper flange member, said lower and upper flange members having slots located therein,
   (c) first and second electrically nonconductive retention members secured to the first surface of said plate section between said upper and lower flange members, the lower ends of said retention members being spaced from said lower flange member,
   (d) an indicator lamp having first and second leads extending through the slot in said upper flange member, the lower portion of said lamp being in contact with said first retention member,
   (e) a primary conductor having spaced apart input and output terminals positioned between said first and second retention members and said lower flange member, said primary conductor electrically connecting said input and output terminals, the first lead of said indicator lamp being secured to said primary conductor,
   (f) an electrically nonconductive base section extending below said plate section,
   (g) a resistor having first and second leads positioned adjacent said indicator lamp in the slot in said lower flange member, the first lead of said resistor being connected to the second lead of said indicator lamp, and
   (h) a ground conductor having a flat portion contiguous with the bottom of said base section and a plurality of tabs secured to the sides of said base section, the second lead of said resistor being secured to said ground conductor, said lamp being energized when a voltage is impressed between said primary conductor and said ground conductor.

5. A combined electrical connector and indicator as defined by claim 4 wherein a key is secured to the second surface of said plate section, the width of said key being slightly less the width of the slot in said upper flange.

6. A terminal strip comprising a plurality of terminal blocks, each of said blocks including
   (a) an electrically nonconductive plate section having first and second surfaces,
   (b) upper and lower electrically nonconductive flange members extending from the first surface of said plate section, said lower flange member being spaced from said upper flange member, said upper flange member having a slot located therein,
   (c) an indicator lamp poistioned within the slot in said upper flange member,
   (d) an electrically conductive primary conductor having spaced apart input and output terminals secured to said lower flange, said primary conductor electrically connecting said input and output terminals,
   (e) an electrically nonconductive base section located below said support plate,
   (f) an electrically conductive ground conductor secured to said base section, said ground conductor having a flat portion contiguous with the bottom of said base section and a plurality of tabs secured to the sides of said base section,
   (g) means electrically coupling said indicating lamp between said primary and ground conductors, and
   (h) a key secured to the second surface of said plate section, the key on each of said terminal blocks fitting into the slot in the upper flange of the adjacent terminal block, said key preventing said block from shifting laterally and holding the lamp in said adjacent block in position.

References Cited by the Examiner

UNITED STATES PATENTS

| | | | |
|---|---|---|---|
| 2,740,111 | 3/1956 | Bogue et al. | 340—381 |
| 2,981,922 | 4/1961 | Van Valkenburg et al. | 339—198 |
| 3,192,444 | 6/1965 | Mueller | 339—198 |
| 3,207,956 | 9/1965 | Rothweiler et al. | 340—252 X |

NEIL C. READ, *Primary Examiner.*

I. J. LEVIN, *Assistant Examiner.*